(No Model.) 2 Sheets—Sheet 2.
J. E. BROWN.
COMBINED CORN HARVESTER AND SHUCKER.
No. 594,823. Patented Nov. 30, 1897.
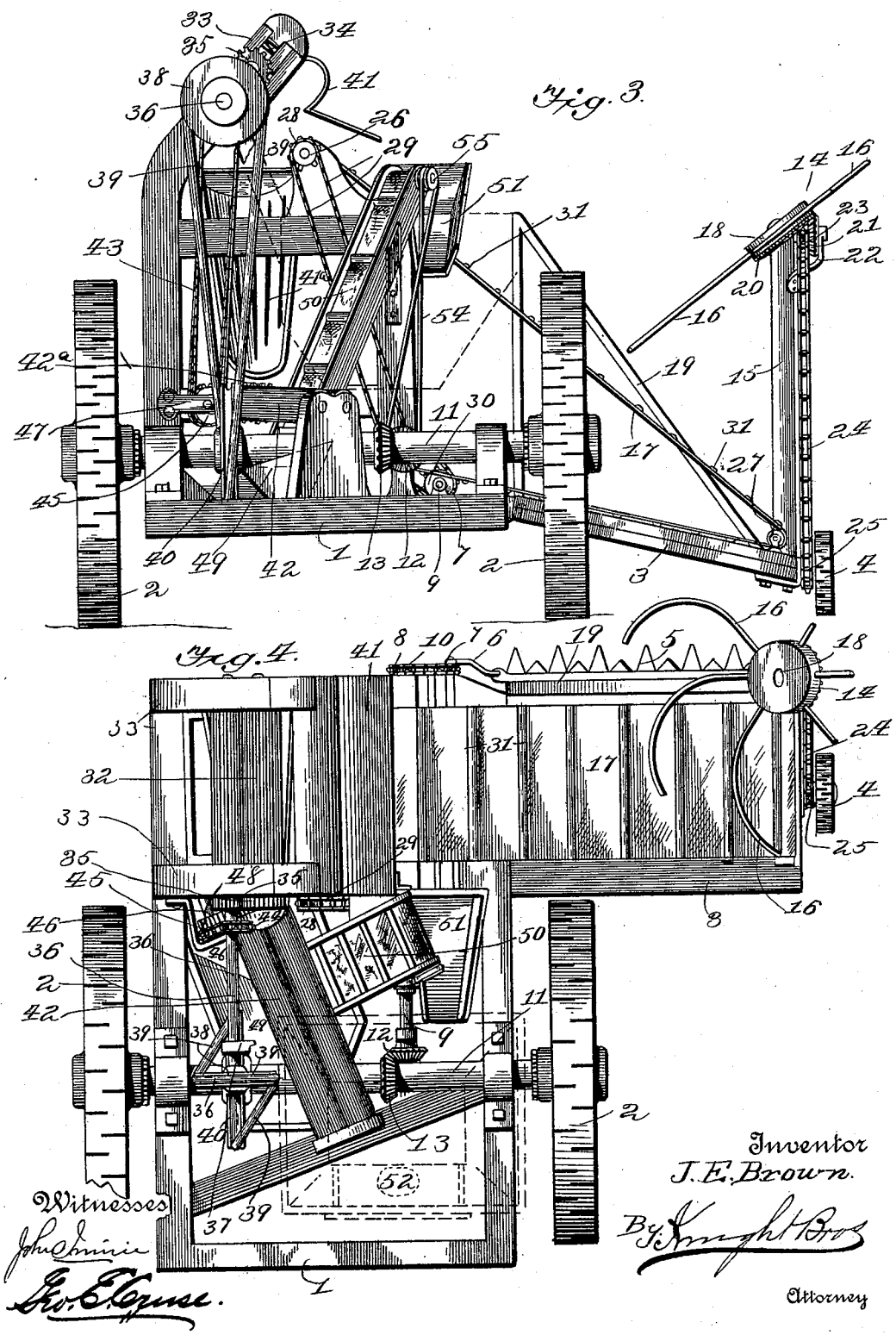

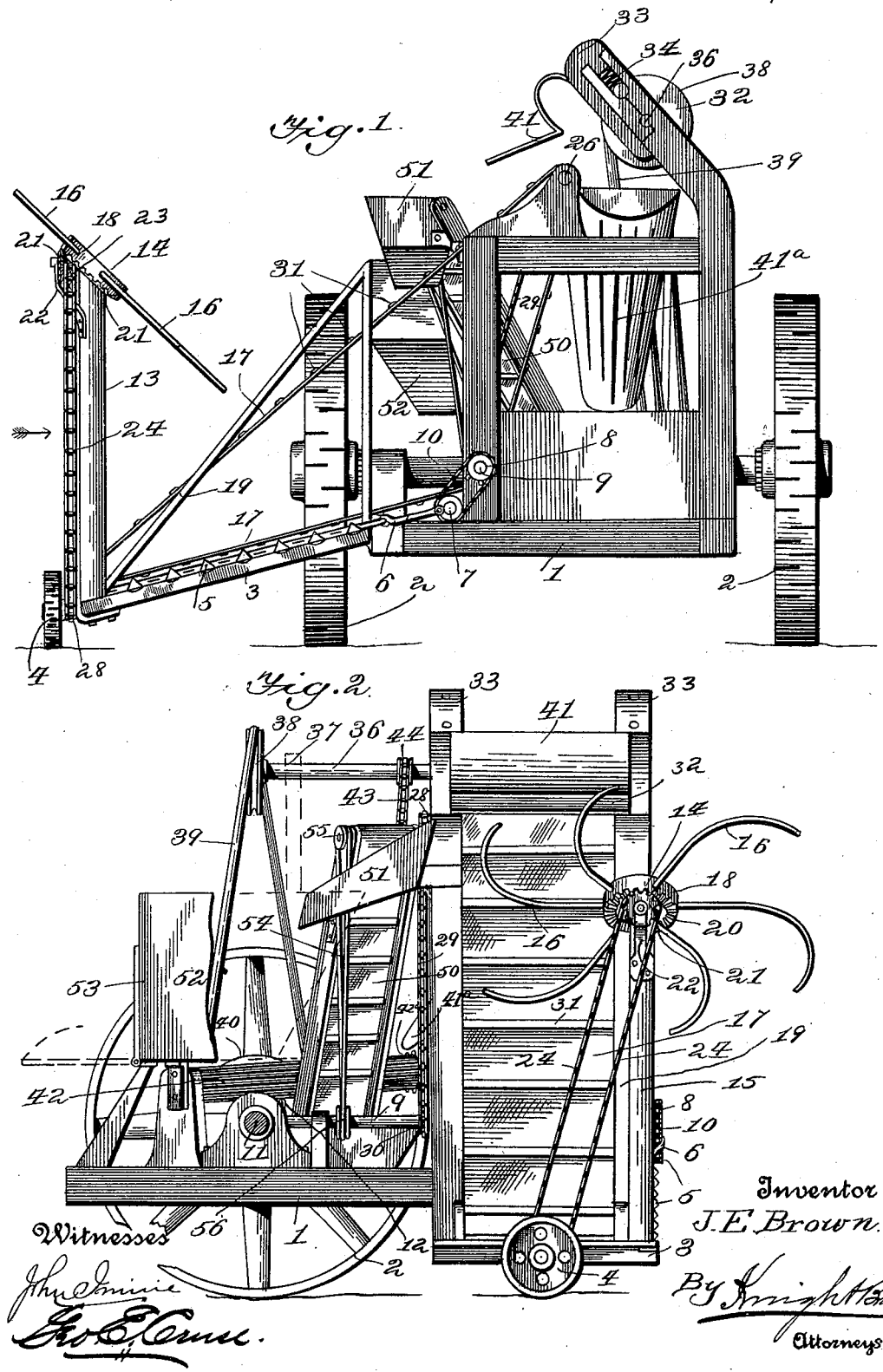

UNITED STATES PATENT OFFICE.

JOSEPH E. BROWN, OF HUBBARD, NEBRASKA.

COMBINED CORN HARVESTER AND SHUCKER.

SPECIFICATION forming part of Letters Patent No. 594,823, dated November 30, 1897.

Application filed January 16, 1896. Renewed November 4, 1897. Serial No. 657,427. (No model.)

*To all whom it may concern:*

Be it known that I, JOSEPH E. BROWN, a citizen of the United States, residing at Hubbard, in the county of Dakota and State of Nebraska, have invented certain new and useful Improvements in a Combined Corn Harvester and Shucker, of which the following is a specification.

My invention is an improvement on those machines which are adapted by a continuous operation to harvest corn, remove the ears from the stalks, and shuck the ears.

My improvement consists in a machine comprising a main frame, a supplemental frame extending outwardly and downwardly from the main frame, an outwardly-inclined cutter for cutting the stalks at an angle to produce sharp-ended butts to the stalks, a belt-conveyer which works laterally of the machine over the supplemental frame for conveying the cut stalks to the top of the machine, an inclined bar extending from the main frame to the outer end of the cutter, an inwardly-inclined reel working at a right angle approximately to the inclined bar for throwing down the stalks over the latter, so that the belt-conveyer will forward the stalks butt-end first, a pair of stripping-rolls into which the sharpened ends of the stalks are fed for removing the ears, a shield for preventing the separated ears from falling down the belt-conveyer, and a pair of shucking-rolls to which the ears are fed for husking, all as hereinafter described and claimed.

In order that my invention may be fully understood, I will proceed to describe the same with reference to the accompanying drawings, in which—

Figure 1 is a front elevation of my machine. Fig. 2 is a side elevation looking in the direction of the arrow, Fig. 1. Fig. 3 is a rear elevation, and Fig. 4 is a plan view.

In the said drawings, 1 represents the main frame of the machine, on which the several parts of the device are mounted and arranged, and 2 represents the ground-wheels, which support the frame and which supply power for operating the several parts, as will be hereinafter more fully set forth.

3 represents a supplemental frame extending out from one side of the machine and at an incline, and it is supported at its free end by the small ground-wheel 4.

5 represents the cutter-knives, which are of the usual construction, located on the frame 3, and they cut the growing stalks as the machine is moved along at an angle to produce sharpened ends to the butts of the stalks. The knives are operated by means of the pitman 6, which is connected at one end to the knives and at the other end to a gear-wheel 7, mounted on the frame 1, the gear-wheel 8 being carried by a shaft 9, journaled in the frame 1 in any suitable manner, and by the chain 10. The shaft 9 derives its motion from the axle 11, on which the ground-wheels 2 are mounted, through the medium of the bevel gear-wheels 12 and 13, located, respectively, on the shaft 9 and axle 11. As the stalks are cut by the knives they are caught by the arms 16 of the inwardly-inclined reel 14, mounted on a suitable support 15 on the frame 3, which tends to throw the ends of the stalks down onto the conveyer-belt 17, which is so arranged as to catch any height of stalks and feed them butt-ends first. This operation is accomplished, as above stated, by the radial arms 16, which extend out from an inwardly-inclined head 18, constantly revolving, and they are assisted by means of the inclined bar 19, also mounted on the frame 3, crossing the reel at approximately a right angle to the latter. By this construction it will be seen that as the stalks are cut the heads are guided downward, so that as they fall onto the belt 17, working laterally of the machine, the cut ends will be the first part of the stalk to pass through the primary rolls.

The advantage of the above arrangement is that the cut ends will pass through the primary rolls first, so that the rolls will have a better grip on the stalks, and by reason of the manner of growth of the ears on the stalks they will not be bent back and torn, but will be forced off. Another advantage is that the main part of the stalks will not be torn when they are drawn through the rolls and they will be dropped clear of the machine, so that they can be conveniently gathered and bunched.

The head 18 is revolved by the following means: 20 represents a bevel-gear formed on the under side of the head 18, and it has in engagement with it the bevel-pinion 21, mounted upon a short shaft which is supported in a bracket 22. This short shaft also carries a sprocket-wheel 23, over which a chain 24 passes, the said chain also passing over a sprocket-wheel 25, mounted on the axle of the small ground-wheel 4. Thus it will be seen as the machine is drawn forward the reel will be revolved.

The belt 17, onto which the stalks are guided, passes from the outer end of the supplemental frame to and from the top of the machine over the rolls 26 and 27 and a third roll, (not shown,) which rolls are so arranged as to produce a long incline, as shown, onto which the stalks are guided, and motion is given to the belt through the medium of the roll 26, which has a sprocket-wheel 28 mounted on it, over which a chain 29 passes. This chain also passes over a sprocket-wheel 30, located on the shaft 9.

The belt 17 is provided with suitable cleats 31, which materially assist in holding the stalks on the belt as they are raised. As the stalks are carried up cut ends foremost they are passed between a pair of stripping-rollers 32, which remove the ears from the stalks and allow only the stalks to pass between them. These rollers 32 are suitably corrugated and are mounted in the support 33, projecting up from the frame 1. The upper roll is loosely journaled in the support 33, so as to allow of it moving to accommodate itself to the varying thicknesses of stalks, but it is normally held in contact with the lower roll by means of the springs 34. Each of the rolls is provided with a gear-wheel 35, intermeshing with each other, and the lower roll is provided with a long shaft 36, the outer end of which is suitably supported in a standard 37. Located on the shaft 36 is a pulley 38, over which a belt 39 passes, the belt also passing over a pulley 40, located on the axle 11.

41 represents a shield or guard extending out from the supports 33 for preventing the ears dropping back onto the belt 17. After the ears have been removed they drop onto an inclined chute 41ª and are then conveyed to a second pair of rolls 42. These rolls are arranged at an angle to the main axle and, as shown, are corrugated, and they are designed to remove the husks from the ears of corn as they come from the chute. They are mounted on suitable journals carried by the frame 1, and they are provided on one end with gear-wheels 42ª, which intermesh with each other. Motion is given these rolls by means of a chain belt 43, which passes over sprockets 44 and 45, located on the shaft 36, and a short shaft 46, journaled in a bracket 47, carried by the frame 1. A gear-wheel 48 is also mounted on this short shaft and is in engagement with the gears on the rolls. After the ears have had their final treatment, which consists in the rolls 42 removing the remaining husks and silk from them, they drop from the rolls into a hopper 49, located under the rolls and carried by the framework, and from there they are conveyed by means of a belt 50 to a chute 51, which guides the ears into another hopper 52, from where the ears are removed through a hinged gate 53. Motion is given the belt, which is mounted on rollers suitably arranged, by a belt 54, which passes over a pulley 55, carried by one of the rollers, and a pulley 56, located on the shaft 9.

The operation of my device is as follows, it being understood that the several parts of the machine are properly mounted, placed, and so timed with relation to each other as to form a complete operation: The machine is moved along in the field, and as it is done the several parts are put in operation. As the machine advances the knives cut the corn and the reel and inclined bar direct it onto the belt the cut ends foremost. The advantage of this is that the joint connecting the ear with the stalk is first brought into contact with the rolls and broken, whereas if they were allowed to be fed the other end first the ear would be torn and bruised before it was broken off. After the ears have been broken off they fall into the chute and are conveyed to the second set of rolls. These rolls are so constructed and arranged that no matter which way the ear is fed into them the husk will be removed. This is accomplished by placing the rolls close together, and the jarring motion of the machine will cause the ear to turn, so that the corrugations will catch all the remaining silk and husks. After the husks are removed the ears drop into a hopper, from where they are conveyed to another hopper. After this hopper has become filled they are removed through the hinged gate provided for the purpose.

Having thus described my invention, the following is what I claim as new therein and desire to secure by Letters Patent:

1. A corn harvesting and shucking machine comprising a main frame, a supplemental frame outwardly inclined from the main frame, the cutter inclined in the direction of the supplemental frame so as to cut the stalks at an angle to produce sharp-ended butts to the stalks, a belt-conveyer working laterally from the outer end of the supplemental frame to the top of the machine for conveying the cut stalks, an inclined bar extending from the main frame to the outer end of the cutter, an inwardly-inclined reel working at a right angle approximately to the inclined bar for throwing down the stalks over the latter so that the belt-conveyer will forward the stalks butt-end first, a pair of stripping-rolls into which the sharpened ends of the stalks are fed for removing the ears, a shield for preventing the separated ears from falling down the belt-conveyer, a pair of shucking-rolls to which the ears are fed for husking, and suitable operating mechanism; substantially as described.

2. A corn-harvester comprising a main frame, a supplemental frame, extending outwardly and downwardly from the main frame, the cutter inclined in the direction of the supplemental frame, so as to cut the stalks at an angle to produce sharp-ended butts to the stalks, a belt-conveyer for receiving and transferring the cut stalks, an inclined bar extending from the main frame to the outer end of the cutter, a support at the outer end of the supplemental frame, a reel having radial curved arms and mounted on the support at a right angle approximately to the inclined bar, for throwing down the stalks over the latter so that the belt-conveyer will forward the stalks butt-end first, and suitable operating mechanism, substantially as described.

3. A corn harvesting and shucking machine comprising a main frame, stripping-rolls located above the frame, husking-rolls located at the lower part of the frame, an inclined chute conducting the ears from the stripping-rolls onto the husking-rolls, a hopper located beneath the husking-rolls, a hopper located at the rear of the frame, the chute located over the frame, the belt for conveying the ears over the machinery from the hopper beneath the husking-rolls to the chute above, and suitable operating mechanism; substantially as described.

JOSEPH E. BROWN.

Witnesses:
B. C. ADAIR,
B. B. GRIBBLE.